3,228,935
NOVEL 2-PHENYLAMINO-4H-5,6-DIHYDRO-1,3-THIAZINE DERIVATIVES
Otto Behner, Cologne-Stammheim, Hans Henecka, Wuppertal-Elberfeld, Friedrich Hoffmeister, Wuppertal-Vohwinkel, Horst Kreiskott, Wuppertal-Elberfeld, Werner Meiser, Wuppertal-Vohwinkel, and Hans Werner Schubert and Wolfgang Wirth, Wuppertal-Elberfeld, Germany, assignors to Farbenfabriken Bayer Aktiengesellschaft, Leverkusen, Germany, a corporation of Germany
No Drawing. Filed July 5, 1963, Ser. No. 293,168
Claims priority, application Germany, July 5, 1962, F 37,233
9 Claims. (Cl. 260—243)

This invention relates, in general, to organic chemistry, and involves the provision of novel derivatives of 2-phenylamino-4H-5,6-dihydro-1,3-thiazines. In particular, the invention is directed to the provision of certain compounds of the general class described which are found to possess unusual and outstanding pharmacodynamic activities. The invention additionally involves the provision of several alternate syntheses for the production of these compounds.

It has been known heretofore that one may obtain 2-phenylamino-4H-5,6-dihydro-1,3-thiazines, unsubstituted or monosubstituted in the benzene ring, by reacting aryl isothiocyanates with 3-aminopropanol or trimethylene imine, and cyclizing the resulting thioureas by heating in concentrated hydrochloric acid [M. Tisler, Arch. pharm., 293, 621 (1960)]. It is further known that the reaction of γ-chlorobutylamine with phenyl isothiocyanate yields 2-phenylamino - 6 - methyl-4H-5,6-dihydro-1,3-thiazine [A. Luchmann, Ber. deutsch. chem. Ges., 29, 1420 (1896)]. These known compounds possess little or no pharmacological activity.

The present invention is based, in part, on the discovery that compounds of the general class described which possess truly outstanding pharmacological activity are produced when:

(a) Substituted phenyl isothiocyanates are added to 4-amino-butanol-(2) to form the corresponding thiourea, and the latter is then treated with acids, or (b) Substituted phenyl isothiocyanates are reacted with 4-amino-2-halobutanes, or (c) N-phenylthioureas, substituted in the benzene ring, are reacted with 1,3-dihalobutanes or 4-amino-2-halobutane salts, or (d) Aromatic amines, substituted in the benzene ring, are reacted with 3-halobutyl isothiocyanates, or (e) Aromatic amines, substituted in the benzene ring, are reacted with 2-amino-, 2-mercapto-, or 2-alkylmercapto-6-methyl-4H-5,6-dihydro-1,3-thiazines, if desired, in the presence of acids.

Typical preferred substituent groups of the foregoing reaction components include lower alkyl, aryl, aralkyl and alkoxy, as well as halogen atoms, trihalomethyl, nitro, acyl, acylamino or hydroxy groups.

The foregoing reactions utilized in the production of the unique compounds of the invention can be effected in aqueous, aqueous-alcoholic or alcoholic solution, as well as in aliphatic, or aromatic solvents, or in the melt, the particular choice of a suitable solvent or diluent merely being determined in established manner having reference to the stability and reactivity of the specific reaction components in each instance. In this connection, the use of solvents or diluents generally proves to be expedient, but is not absolutely necessary.

The compounds of the invention which, as pointed out hereinabove, are unique in the fact that they possess a surprising variety of pharmacodynamic activities, are intended for administration as therapeutic agents in base form or in the form of their salts with non-toxic inorganic or organic acids. Thus, certain specific derivatives of the invention which are substituted several times in the phenyl nucleus exhibit a morphine-like analgetic action, whereas on oral administration they act as potent tranquilizers. Additionally, the compounds are found to be possessed of noteworthy coronary activity with respect to increasing oxygen saturation (sinus vein), and also possess relatively strong stimulant effects.

It is believed that the invention may be best understood by reference to the following specific examples illustrating the application of the foregoing principles and procedures in the production of typical compounds of the invention:

*Example I*

1-amino-butanol-(3), in amount of 26.7 grams (0.3 mole), was dissolved in 150 cubic centimeters of ether and treated, dropwise, with rapid stirring, with a solution of 49.5 grams (0.3 mole) of 3-methoxy-phenyl isothiocyanate in 50 cubic centimeters of ether. The mixture was then heated for 3 hours under reflux, the ether was removed in vacuum, and the residue was treated with 300 cubic centimeters of concentrated hydrochloric acid for 2 hours on the steam bath. The hot solution was diluted with 1 liter of water, clarified with animal charcoal, rendered alkaline with a dilute caustic soda solution, while cooling, and shaken several times with ether. From the ether extracts dried with sodium sulfate, there was obtained after withdrawing the solvent in vacuum, 39.7 grams (56% of the theoretical) of 2-(3-methoxyphenyl-amino)-6-methyl-4H-5,6-dihydro-1,3-thiazine of melting point 101–102° C. (from alcohol). The hydrochloride of this base produced in alcoholic solution with ethereal hydrochloric acid, melts at 137–138° C.

Analysis.—$C_{12}H_{17}ClN_2OS$ (272.8):

|  | N | S | Cl |
| --- | --- | --- | --- |
| Calculated | 10.27 | 11.75 | 13.00 |
| Found | 10.26 | 11.91 | 13.09 |

*Example II*

In an analogous manner there was produced 2-(2,6-diethylphenylamino)-6-methyl - 4H - 5,6 - dihydro-1,3-thiazine. Melting point 112° C. (from alcohol).

Analysis.—$C_{15}H_{22}N_2S$:

|  | C | H | N | S |
| --- | --- | --- | --- | --- |
| Calculated | 68.67 | 8.45 | 10.68 | 12.22 |
| Found | 68.86 | 8.32 | 10.71 | 12.12 |

*Example III*

In the same manner, there was obtained 2-(2-chloro-5-trifluoromethyl-phenylamino)-6-methyl - 4H - 5,6 - dihydro-1,3-thiazine. Melting point 181° C. (from benzene).

Analysis.—$C_{12}H_{12}ClF_3N_2S$ (308.8):

|  | N | S |
| --- | --- | --- |
| Calculated | 9.07 | 10.63 |
| Found | 8.84 | 10.59 |

*Example IV*

In the same manner, there was obtained 2-(3,4,5-trimethoxyphenylamino)-6-methyl - 4H - 5,6 - dihydro-1,3-thiazine. Melting point 156–158° C. (from benzene-ligroin).

Analysis.—$C_{14}H_{20}N_2O_3S$ (296.4):

|            | C     | H    | N    |
|------------|-------|------|------|
| Calculated | 56.71 | 6.80 | 9.45 |
| Found      | 56.82 | 6.92 | 9.39 |

Example V 3-bromobutylamine hydrobromide, in amount of 23.3 grams (0.1 mole), produced from 3-hydroxybutylamine and 48% hydrobromic acid; melting point 64° C.) was dissolved in 75 cubic centimeters of absolute alcohol and treated with 5.6 grams (0.1 mole) of potassium hydroxide in 25 cubic centimeters of absolute alcohol, while cooling. After briefly stirring, it was filtered off with suction from potassium bromide, 18.4 grams (0.1 mole) of 2-methyl-5-chlorophenyl isothiocyanate were added and the mixture was heated for 6 hours at boiling temperature. The alcohol was then removed by evaporation in vacuum, the residue was taken up with water, filtered, rendered alkaline with cooling and extracted with ether. After drying the extract with sodium sulfate and removing the solvent, 16.3 grams (64% of the theoretical) were obtained of the compound 2-(2-methyl-5-chlorophenylamino)-6-methyl-4H-5,6-dihydro-1,3-thiazine of melting point 144–146° C. (from alcohol). The hydrochloride was produced in acetone solution with ethereal hydrochloric acid and melts at 175–177° C.

Analysis.—$C_{12}H_{16}Cl_2N_2S$ (291.2):

|            | C     | H    | Cl–   | N    | S     |
|------------|-------|------|-------|------|-------|
| Calculated | 49.48 | 5.54 | 12.18 | 9.62 | 11.01 |
| Found      | 49.64 | 5.50 | 12.34 | 9.54 | 10.94 |

Example VI 3-bromobutylamine hydrobromide, in amount of 2.3 grams (0.1 mole), and 18.0 g. (0.1 mole) of 2,6-dimethylphenylthiourea were well mixed and melted together. The reaction mixture was heated slowly to 150° C., held for ¼ hour at this temperature and allowed to cool. The cooled melt was taken up in water, treated with animal charcoal, filtered and treated while cooling with a caustic soda solution until a strongly alkaline reaction resulted. The released base was shaken up with ether, and the hydrochloride of 2-(2,6-dimethylphenylamino)-6-methyl-4H-5,6-dihydro-1,3-thiazine was precepated from the extracts, dried with sodium sulfate by adding ethereal hydrochloric acid. The melting point is 149–151° C. (from alcohol with ether).

Analysis.—$C_{13}H_{19}ClN_2S$ (270.8):

|            | C     | H    | Cl    | N     |
|------------|-------|------|-------|-------|
| Calculated | 57.64 | 7.07 | 13.09 | 10.34 |
| Found      | 57.26 | 7.05 | 13.18 | 10.20 |

Example VII 3-chlorobutyl isothiocyanate, in amount of 15.0 grams (0.1 mole), (produced from 3-chlorobutylamine hydrochloride and thiophosgene in water/ethylene chloride in the presence of calcium carbonate at room temperature; boiling point 93–95° C. at 12 mm. Hg) and 12.8 grams (0.1 mole) of 3-chloroaniline were stirred under reflux in 100 cubic centimeters of absolute xylene for 5 hours. An oil separated which was then separated from the xylene, taken up in water and treated, while cooling, with excess caustic soda solution. The 2-(3-chlorophenyl-amino)-6-methyl-4H-5,6-dihydro-1,3-thiazine which precipitated was extracted with ether, the solution was dried over sodium sulfate and, after removing the solvent, recrystallized from benzene (melting point 116–118° C.). For conversion into the hydrochloride, the alcoholic solution of the base is neutralized with ethereal hydrochloric acid. By adding ether the salt comes down as a colorless precipitate of melting point 176–178° C.

Analysis.—$C_{11}H_{14}Cl_2N_2S$ (277.2):

|            | C     | H    | Cl–   | N     | S     |
|------------|-------|------|-------|-------|-------|
| Calculated | 47.66 | 5.09 | 12.79 | 10.11 | 11.57 |
| Found      | 47.54 | 5.16 | 12.90 | 9.92  | 11.12 |

Example VIII 2-amino-6-methyl-4H-5,6-dihydro-1,3-thiazine hydrobromide of melting point 147–148° C. (the corresponding base can be produced by treating thiocyanobutylamino hydrobromide, obtainable from 3-bromobutylamine hydrobromide, with weak alkalies in aqueous solution), in amount of 21.1 grams (0.1 mole), was dissolved in a little absolute alcohol and mixed with a solution of 5.6 grams (0.1 mole) of potassium hydroxide in 25 cubic centimeters of absolute alcohol, while stirring and cooling. After a short period, the potassium bromide is filtered off, the mother liquor is concentrated in vacuum to dryness, and heated after addition of 32 grams (0.3 mole) of o-toluidine, for 3 hours to 180–200° C., whereby ammonia was developed. It was then allowed to cool to about 100° C., and the excess o-toluidine was removed in vacuum. The residue was recrystallized from alcohol. The resulting compound, 2-(2-methylphenylamino)-6-methyl-4H-5,6-dihydro-1,3-thiazine, has the melting point 95–97° C.

Analysis.—$C_{12}H_{16}N_2S$ (220.3):

|            | C     | H    | N     | S     |
|------------|-------|------|-------|-------|
| Calculated | 65.41 | 7.32 | 12.72 | 14.56 |
| Found      | 65.40 | 7.43 | 12.62 | 14.94 |

What is claimed is:
1. A chemical compound represented by the formula:

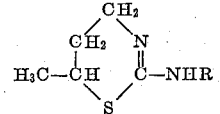

wherein R is a member selected from the group consisting of lower alkylphenyl-; di-lower alkylphenyl-; lower alkoxyphenyl-; tri-lower alkoxyphenyl-; chloro-trifluoromethyl-phenyl-; lower alkyl-chlorophenyl-; and chlorophenyl-.

2. The chemical compound, 2 - (3-methoxyphenyl-amino)-6-methyl-4H-5,6-dihydro-1,3-thiazine.

3. The chemical compound, 2 - (2,6-diethylphenyl-amino)-6-methyl-4H-5,6-dihydro-1,3-thiazine.

4. The chemical compound, 2-(2-chloro-5-trifluoro-methyl-phenylamino) - 6 - methyl-4H-5,6-dihydro-1,3-thiazine.

5. The chemical compound, 2 - (3,4,5 - trimethoxy-phenylamino)-6-methyl-4H-5,6-dihydro-1,3-thiazine.

6. The chemical compound, 2 - (2-methyl-5-chlorophenylamino)-6-methyl-4H-5,6-dihydro-1,3-thiazine.

7. The chemical compound, 2-(2,6-dimethylphenyl-amino)-6-methyl-4H-5,6-dihydro-1,3-thiazine.

8. The chemical compound, 2-(3-chlorophenylamino)-6-methyl-4H-5,6-dihydro-1,3-thiazine.

9. The chemical compound, 2-(2-methylphenylamino)-6-methyl-4H-5,6-dihydro-1,3-thiazine.

References Cited by the Examiner

Luchmann, "Chemische Berichte," vol. 29, p. 1430 (1896).

Tisler, "Archive der Pharmazie," vol. 293, pp. 621–626 (1960).

WALTER A. MODANCE, *Primary Examiner.*

NICHOLAS S. RIZZO, *Examiner.*